US010054499B2

(12) United States Patent
Karunaratne et al.

(10) Patent No.: US 10,054,499 B2
(45) Date of Patent: Aug. 21, 2018

(54) ENGINE DIAGNOSTIC SYSTEM AND METHOD

(71) Applicant: General Electric Company, Schenectady, NY (US)

(72) Inventors: Milan Palinda Karunaratne, Irvine, CA (US); Benedict George Lander, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 15/134,059

(22) Filed: Apr. 20, 2016

(65) Prior Publication Data

US 2017/0306915 A1    Oct. 26, 2017

(51) Int. Cl.
| | |
|---|---|
| *G01K 13/00* | (2006.01) |
| *F02D 41/22* | (2006.01) |
| *G01K 13/02* | (2006.01) |
| *G01K 15/00* | (2006.01) |
| *F02D 41/14* | (2006.01) |

(52) U.S. Cl.
CPC ......... *G01K 13/00* (2013.01); *F02D 41/1446* (2013.01); *F02D 41/221* (2013.01); *G01K 13/02* (2013.01); *G01K 15/007* (2013.01); *F02D 41/1443* (2013.01); *F02D 41/1497* (2013.01); *G01K 2013/024* (2013.01); *G01K 2205/04* (2013.01)

(58) Field of Classification Search
CPC ...... G01K 13/00; G01K 13/02; G01K 15/007; G01K 2013/024; G01K 2205/04; F02D 41/1446; F02D 41/221; F02D 41/1443; F02D 41/1497

USPC ...................................................... 73/114.45
See application file for complete search history.

(56) References Cited

U.S. PATENT DOCUMENTS

| | | | |
|---|---|---|---|
| 6,675,639 B1* | 1/2004 | Schricker | G01M 15/102 73/114.01 |
| 6,754,604 B2 | 6/2004 | Weiland | |
| 9,127,632 B2* | 9/2015 | Hoffmann | F02D 41/2096 |
| 2008/0269980 A1 | 10/2008 | Spivak | |
| 2012/0016563 A1* | 1/2012 | Ohsaki | F02D 41/221 701/102 |

(Continued)

*Primary Examiner* — Lisa Caputo
*Assistant Examiner* — Marrit Eyassu
(74) *Attorney, Agent, or Firm* — GE Global Patent Operation; John A. Kramer (57) ABSTRACT

A system may include at least one engine bank including a plurality of fuel injectors. At least one exhaust temperature sensor is coupled to the engine bank(s). The exhaust temperature sensor(s) is configured to output at least one temperature signal regarding an exhaust temperature of the engine bank(s). A traction system is configured to output at least one electrical signal related to a power output of a vehicle. A control unit is coupled to the exhaust temperature sensor(s) and the traction system. The control unit is configured to receive the temperature signal(s) and the electrical signal(s). The control unit is configured to determine a mechanical and electrical health of the plurality of the fuel injectors by determining a temperature differential value of the temperature signal(s) and a power differential value related to the electrical signal(s), and analyzing a combination of the temperature differential value and the power differential value.

20 Claims, 4 Drawing Sheets

(56) References Cited

U.S. PATENT DOCUMENTS

| | | | |
|---|---|---|---|
| 2012/0323465 A1* | 12/2012 | Peters | F02D 41/0082 |
| | | | 701/104 |
| 2013/0245920 A1* | 9/2013 | Vos | F02D 41/1443 |
| | | | 701/104 |
| 2017/0001581 A1* | 1/2017 | Rinker | B60R 16/03 |

* cited by examiner

ENGINE DIAGNOSTIC SYSTEM AND METHOD

TECHNICAL FIELD

Embodiments of the subject matter disclosed herein relate to diagnostic systems and methods for internal combustion engines.

BACKGROUND

Various vehicles include internal combustion engines that may include a plurality of fuel injectors that are configured to inject fuel into engine cylinders. For various reasons, a particular fuel injector may malfunction during operation of the engine. For example, a fuel injector may mechanically malfunction by latching (that is, closing and preventing or otherwise restricting fuel from entering into a respective engine cylinder). As another example, a fuel injector may electrically malfunction, such as by being unplugged.

An engine control unit (ECU) is typically coupled to the fuel injectors of an engine and is configured to control operation of the fuel injectors. However, the ECU may not detect or otherwise be aware of a mechanically latched injector. During such latching, the engine may continue to generate power, but at a higher fuel consumption rate. The ECU may detect the higher fuel consumption rate, but is typically unaware of what is causing the increased fuel consumption rate. When the vehicle is serviced, mechanics typically need to examine the fuel injectors to determine whether one or more fuel injectors are faulty, if there is an electrical harness issue, or if the fuel injector is mechanically and electrically sound.

Accordingly, the process of determining the reason for a malfunction within an engine is typically labor and time intensive.

Therefore, a need may exist for a system and method of efficiently and reliably determining a cause of a malfunction of an engine system, and/or a system and method of pinpointing one or more reasons for inefficient operation of an engine system.

BRIEF DESCRIPTION

In an embodiment, a system includes at least one engine bank including a plurality of fuel injectors. At least one exhaust temperature sensor is coupled to the engine bank(s). The exhaust temperature sensor(s) is configured to output at least one temperature signal regarding an exhaust temperature of the engine bank(s). A traction system is configured to output at least one electrical signal related to a power output of a vehicle (such as a power output of an alternator). A control unit is coupled to the exhaust temperature sensor(s) and the traction system. The control unit is configured to receive the temperature signal(s) and the electrical signal(s). The control unit is configured to determine a mechanical and electrical health of the fuel injectors by determining a temperature differential value of the temperature signal(s) and a power differential value related to the electrical signal(s), and analyzing a combination of the temperature differential value and the power differential value.

In at least one embodiment, the at least one engine bank may include first and second engine banks. The at least one exhaust temperature sensor may include first and second exhaust temperature sensors coupled to the first and second engine banks. The at least one temperature signal may include a first temperature signal of a first exhaust temperature of the first engine bank, and a second temperature signal of a second exhaust temperature of the second engine bank. The temperature differential value may be a difference between the first and second temperature signals.

In at least one embodiment, the at least one electrical signal may include one or both of voltage and current of an alternator of the traction system that relates to a horsepower output of the vehicle. The power differential value may include a comparison between the horsepower output of the vehicle and a stored estimated horsepower based on current fuel consumption of the vehicle.

In at least one embodiment, the control unit may be configured to determine a healthy balanced injection among all of the fuel injectors when the combination of the temperature differential value and the power differential value is between upper and lower temperature thresholds related to the temperature differential value (for example, a temperature differential value component of the combination is between the upper and lower temperature thresholds) and upper and lower power error thresholds related to the power differential value (for example, a power differential value component of the combination is between the upper and lower power error threshold).

The control unit may be configured to determine an electrical fault of at least one of the fuel injectors when the combination of the temperature differential value and the power differential value is above the upper temperature threshold or below the lower temperature threshold, and between the upper and lower power error thresholds. For example, a temperature differential value component of the combination is above the upper temperature threshold or below the lower temperature threshold, while a power differential value component of the combination is between the upper and lower power error thresholds.

The control unit may be configured to determine a mechanical fault of at least one of the fuel injectors when the combination of the temperature differential value and the power differential value is above the upper temperature threshold or below the lower temperature threshold, and above the upper power error threshold or below the lower power error threshold. For example, a temperature differential value component of the combination is above the upper temperature threshold or below the lower temperature threshold, while a power differential value component of the combination is above the upper power error threshold or below the lower error threshold.

The control unit may be configured to determine a number of mechanical faults of the fuel injectors based on a position of the combination of the temperature differential value and the power differential value in relation to the upper or lower power error thresholds and at least one faulty sensor threshold.

The control unit may be configured to determine a balanced mechanical fault between first and second engine banks when the combination of the temperature differential value and the power differential value is between the upper and lower temperature thresholds, and above the upper power error threshold or below the lower power error threshold.

In at least one embodiment, the control unit may be configured to determine a fault in the exhaust temperature sensor(s) when the combination of the temperature differential value and the power differential value is beyond one or more faulty sensor thresholds.

In at least one embodiment, the control unit may be or otherwise include an engine control unit onboard the vehicle.

Certain embodiments of the present disclosure provide a method that may include injecting fuel into at least one engine bank with a plurality of fuel injectors, outputting at least one temperature signal regarding an exhaust temperature of the engine bank(s) by at least one exhaust temperature sensor that is coupled to the at least one engine bank, outputting at least one electrical signal related to a power output of a vehicle, receiving the temperature signal and the electrical signal with a control unit, determining a mechanical and electrical health of the plurality of fuel injectors, using a control unit, by determining a temperature differential value of the temperature signal(s) and a power differential value related to the electrical signal(s), and analyzing a combination of the temperature differential value and the power differential value.

In at least one embodiment, the at least one engine bank may include first and second engine banks. The at least one exhaust temperature sensor may include first and second exhaust temperature sensors coupled to the first and second engine banks. The at least one temperature signal may include a first temperature signal of a first exhaust temperature of the first engine bank, and a second temperature signal of a second exhaust temperature of the second engine bank. The temperature differential value may be determined by determining a difference between the first and second temperature signals.

In at least one embodiment, the at least one electrical signal may include one or both of voltage and current of an alternator of the traction system that relates to a horsepower output of the vehicle. The power differential value may be determined by comparing the horsepower output of the vehicle and a stored estimated horsepower based on current fuel consumption of the vehicle.

The mechanical and electrical health may be determined by determining a healthy balanced injection among all of the fuel injectors when the combination of the temperature differential value and the power differential value is between upper and lower temperature thresholds related to the temperature differential value and upper and lower power error thresholds related to the power differential value.

The determining the mechanical and electrical health operation may include determining an electrical fault of at least one of the fuel injectors when the combination of the temperature differential value and the power differential value is above the upper temperature threshold or below the lower temperature threshold, and between the upper and lower power error thresholds.

The determining the mechanical and electrical health operation may include determining a mechanical fault of at least one of the fuel injectors when the combination of the temperature differential value and the power differential value is above the upper temperature threshold or below the lower temperature threshold, and above the upper power error threshold or below the lower power error threshold.

The determining the mechanical and electrical health operation may include determining a number of mechanical faults of the fuel injectors based on a position of the combination of the temperature differential value and the power differential value in relation to the upper or lower power error thresholds and at least one faulty sensor threshold.

The determining the mechanical and electrical health operation may include determining a balanced mechanical fault between first and second engine banks when the combination of the temperature differential value and the power differential value is between the upper and lower temperature thresholds, and above the upper power error threshold or below the lower power error threshold.

The determining the mechanical and electrical health operation may include determining a fault in the at least one exhaust temperature sensor when the combination of the temperature differential value and the power differential value is beyond one or more faulty sensor thresholds.

The method may also include disposing the control unit onboard the vehicle as an engine control unit.

BRIEF DESCRIPTION OF THE DRAWINGS

Reference is made to the accompanying drawings in which particular embodiments and further benefits of the invention are illustrated as described in more detail in the description below, in which:

FIG. 3 (comprising two parts.

DETAILED DESCRIPTION

Embodiments of the present disclosure provide diagnostic systems and methods that may be configured to effectively detect and isolate a malfunctioning fueling injector in an internal combustion engine system. The diagnostic systems and methods are configured to identify root causes of malfunction to allow for quick and effective repair and resolution. The diagnostic systems and methods may analyze parameters in conjunction with thresholds to identify electrical and mechanical faults in fuel injectors.

By identifying causes of injector malfunction, embodiments of the present disclosure reduce asset downtime and avoid unnecessary part replacements and repeat failures. Certain embodiments of the present disclosure provide diagnostic systems and methods that analyze the following power output parameters: exhaust temperature of a first engine bank (such as a left engine bank), exhaust temperature of a second engine bank (such as a right engine bank), horsepower output (such as a true traction horsepower from a traction system), estimated gross power (or horsepower) based on fueling levels (such as determined by an ECU), and/or total fuel values.

The estimated gross power or horsepower may be determined from an existing model that is stored in a memory of the ECU, for example. The estimated horsepower may be a value that models what the gross horsepower of an engine should be based on an amount of fuel being provided to the fuel injectors. The model may be a fuel/torque indicated model. The estimated gross power may be a value that is distinct from a traction system. The estimated gross power provided power estimates based on fuel consumption. For example, an ECU may detect a supply of fuel to an engine that is otherwise sufficient to generate a particular horsepower, but the horsepower output is less than the expected horsepower at the detected fuel supply. An ECU may detect an electrical malfunction of a fuel injector based on electrical signals received from the fuel injector. Accordingly, the ECU may adjust operation of the engine based on the electrical malfunction of the fuel injector. By monitoring the power output parameters, embodiments of the present disclosure are able to distinguish between electrical malfunctions of the fuel injectors, mechanical malfunctions of the fuel injectors, and faulty sensors that otherwise generate false positives.

As noted, embodiments of the present disclosure provide systems and methods of comparing actual tractive output, such as horsepower, to an estimated tractive output. Optionally, the systems and methods may be used to analyze various other types of tractive output, such as power output, speed, revolutions-per-minute, and/or the like.

Embodiments of the present disclosure provide technical advantages in that they provide improved diagnostic strategies that lead to efficient and reliable determination of root causes of fueling-related issues. Further, embodiments of the present disclosure may be used with respect to an entire fleet of vehicles (such as locomotives), and monitor the fleet of vehicles for deviations from normal operating characteristics. Notably, decreased fuel efficiency increases costs of operation. Embodiments of the present disclosure quickly, efficiently, and reliably detect and identify the reasons for decreased efficiency, thereby allowing operators to rectify the issues.

Figure 1:
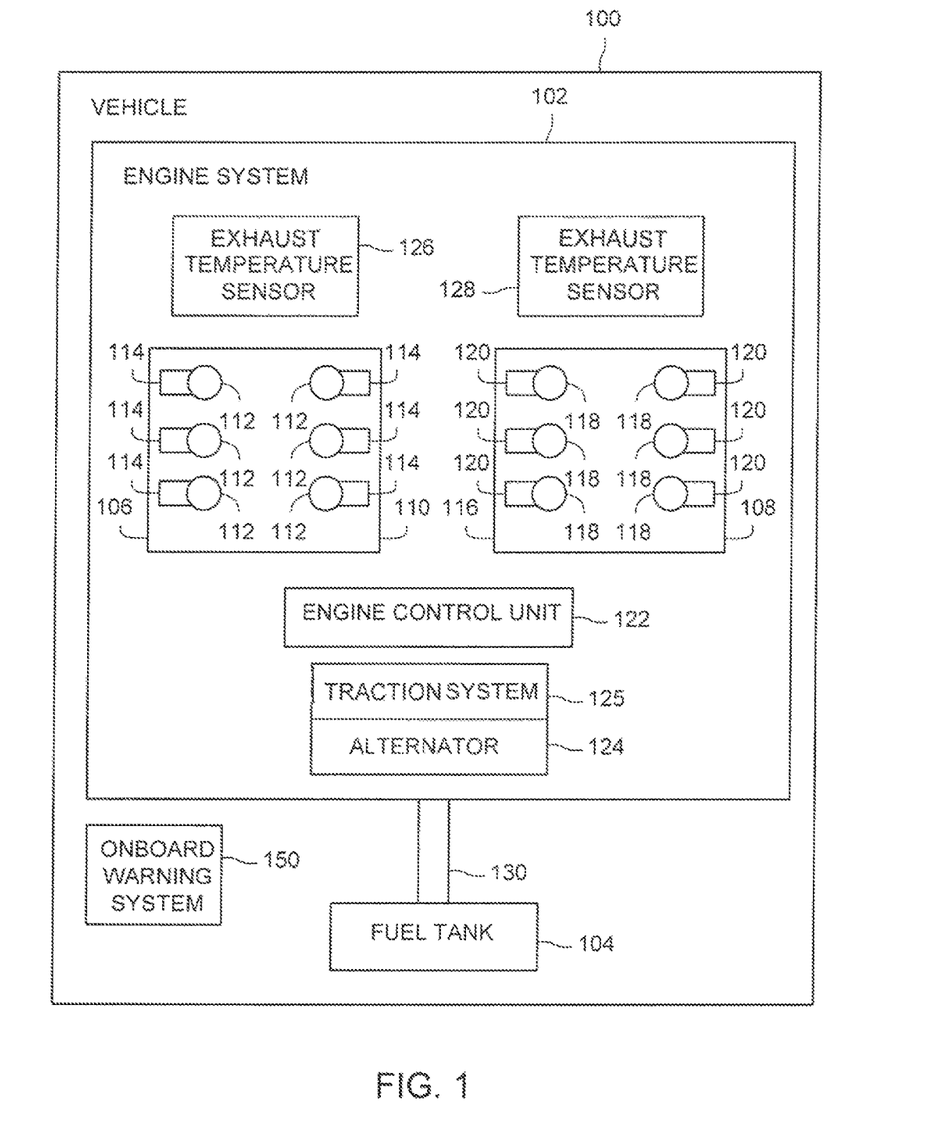
FIG. 1 illustrates a simplified schematic diagram of a vehicle having an internal combustion engine system, according to an embodiment of the present disclosure.

FIG. 1 illustrates a simplified schematic diagram of a vehicle 100 having an internal combustion engine system 102, according to an embodiment of the present disclosure. The engine system 102 connects to a fuel tank 104 that stores fuel that is configured to be supplied to the engine system 102 to power and propel the vehicle 100.

The engine system 102 may include a first engine bank 106 (such as a left engine bank) and a second engine bank 108 (such as a right engine bank). The first engine bank 106 may include a main body 110 having a plurality of cylinders 112, each of which is coupled to a fuel injector 114. Similarly, the second engine bank 108 may include a main body 116 having a plurality of cylinders 118, each of which is coupled to a respective fuel injector 120.

Alternatively, the engine system 102 may include more or less than two engine banks. For example, the engine system 102 may include a single engine bank or three or more engine banks. Also, alternatively, each of the engine banks 106 and 108 may include more or less cylinders and fuel injectors than shown. For example, each of the engine banks 106 and 108 may include five or less cylinders coupled to five or less fuel injectors. In at least one other embodiment, each of the engine banks 106 and 108 may include seven or more cylinders coupled to seven or more fuel injectors.

An engine control unit (ECU) 122 may be in communication with each of the fuel injectors 114, 120, an alternator 124 of a traction system 125, exhaust temperature sensors 126 and 128 (such as digital thermometers within an exhaust line of respective engine banks 106 and 108) that are configured to detect exhaust temperatures of the respective engine banks 106 and 108, as well as a fuel input line 130 that couples the engine system 102 to the fuel tank 104. The ECU 122 is configured to control operation of the engine system 102. The ECU 122 monitors the temperatures of the exhaust from the engine banks 106 and 108 (through signals received from the exhaust temperature sensors 126 and 128), electrical signals (for example, voltages and current) from the alternator 124, and/or signals received from the fuel injectors 114 and 120 to diagnostically analyze the engine system 102, and determine a specific nature and cause of any malfunction. A malfunction refers to a scenario in which the engine system 102 is not operating as efficiently as it is supposed to operate at a particular time.

The ECU 122 monitors various power output parameters (for example, exhaust temperatures, electrical signals of the traction system 125, and/or the like) of the engine system 102 to distinguish between electrical, mechanical, and sensor malfunctions within the engine system 102. Further, the ECU 122 is configured to locate a mechanical malfunction of particular fuel injectors 114 and 120 within their respective engine banks 106 and 108, respectively. For example, a fuel injector 114 or 120 may be stuck closed (that is, latched), such that fuel is blocked or otherwise supplied at a reduced rate to a particular cylinder 112 or 118. The ECU 122 detects the flow of fuel being supplied to the engine system 102 through the fuel input line 130 (such as through one or more flow sensors). By monitoring the fuel flow in relation to the electrical signals of the alternator 124 (such as an output voltage and/or current), the ECU 122 may compare the horsepower output generated by the engine system 102 to an estimated horsepower correlated with the rate of fuel flow within or fuel consumption of the engine system 102. The estimated horsepower for a particular fuel flow or consumption may be stored within a memory of the ECU 122.

If the ECU 122 determines that the horsepower output matches the estimated horsepower or is within an acceptable predetermined range of the estimated horsepower, the ECU 122 may determine that the engine system 102 is operating properly. If, however, the ECU 122 determines that the horsepower output is less than the estimated horsepower, the ECU 122 may determine that a malfunction exists within the engine system 102. The ECU 122 monitors the horsepower output of the engine system 102 by monitoring the electrical signals (such as voltage and current) output by the alternator 124 during operation of the engine system 102. The ECU 122 compares the horsepower output to a stored estimated horsepower that is a function of the input fuel into the engine system. The estimated horsepower may be a stored model, value(s), and/or the like that yields an estimated horsepower to a healthy engine system based on the input fuel into the engine system 102.

As an example, at a fuel flow rate of 100 percent, the ECU 122 may determine the estimated horsepower to be 4500 horsepower. If, however, the horsepower output as detected through the output electrical signals of the alternator is less than 4500 horsepower (such as 4200 horsepower), the ECU 122 may determine that one or more of the fuel injectors 114 or 120 are electrically malfunctioning (for example, one or more of the fuel injectors 114 or 120 are unplugged, are connected to a faulty harness, and/or the like).

Further, by monitoring the temperatures of the engine banks 106 and 108 as detected by the exhaust temperature sensors 126 and 128, the ECU 122 may determine whether one or more of the fuel injectors 114 and 120 are mechanically sound. For example, if the temperatures detected by the exhaust temperature sensors 126 and 128 are the same or within an acceptable range (and conform to acceptable temperatures stored within the memory of the ECU 122), the ECU 122 may determine that the fuel injectors 114 and 120 are working properly. If, however, the ECU 122 determines a difference between the temperatures detected by the exhaust temperature sensors 126 and 128 (for example, a difference outside of an acceptable range), then the ECU 122 may determine that one or more fuel injectors 114 or 120 are mechanically latched. For example if one or more fuel injectors 114 of the engine bank 106 are latched, the temperature of the exhaust of the engine bank 106 is lower than the temperate of the exhaust of the engine bank 108, as more fuel is being supplied to the healthy (that is, properly functioning as per designated operational criteria) fuel injectors of the engine bank 108 to maintain a desired power and speed of the vehicle 100 (as determined and controlled by the ECU 122). Accordingly, the ECU 122 compares the temperature differential between the exhaust temperature sensors 126 and 128 to determine the mechanical health of the fuel injectors 114 and 120 of the engine banks 106 and 108.

As used herein, the term "control unit" (such as an "engine control unit"), "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the ECU 122 may be or include one or more processors that are configured to control operation of the engine system 102.

The ECU 122 is configured to execute a set of instructions that are stored in one or more storage elements (such as one or more memories), in order to process data. For example, the ECU 122 may include or be coupled to one or more memories. The storage elements may also store data or other information as desired or needed. The storage elements may be in the form of an information source or a physical memory element within a processing machine.

The set of instructions may include various commands that instruct the ECU 122 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the ECU 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the ECU 122 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The ECU 122 may also be in communication with an onboard warning system 150 of the vehicle. The ECU 122 may send fault information signals to the onboard warning system 150, which may include a display screen, speakers, and/or the like that communicate the various faults to an operator of the vehicle 100.

Figure 2:
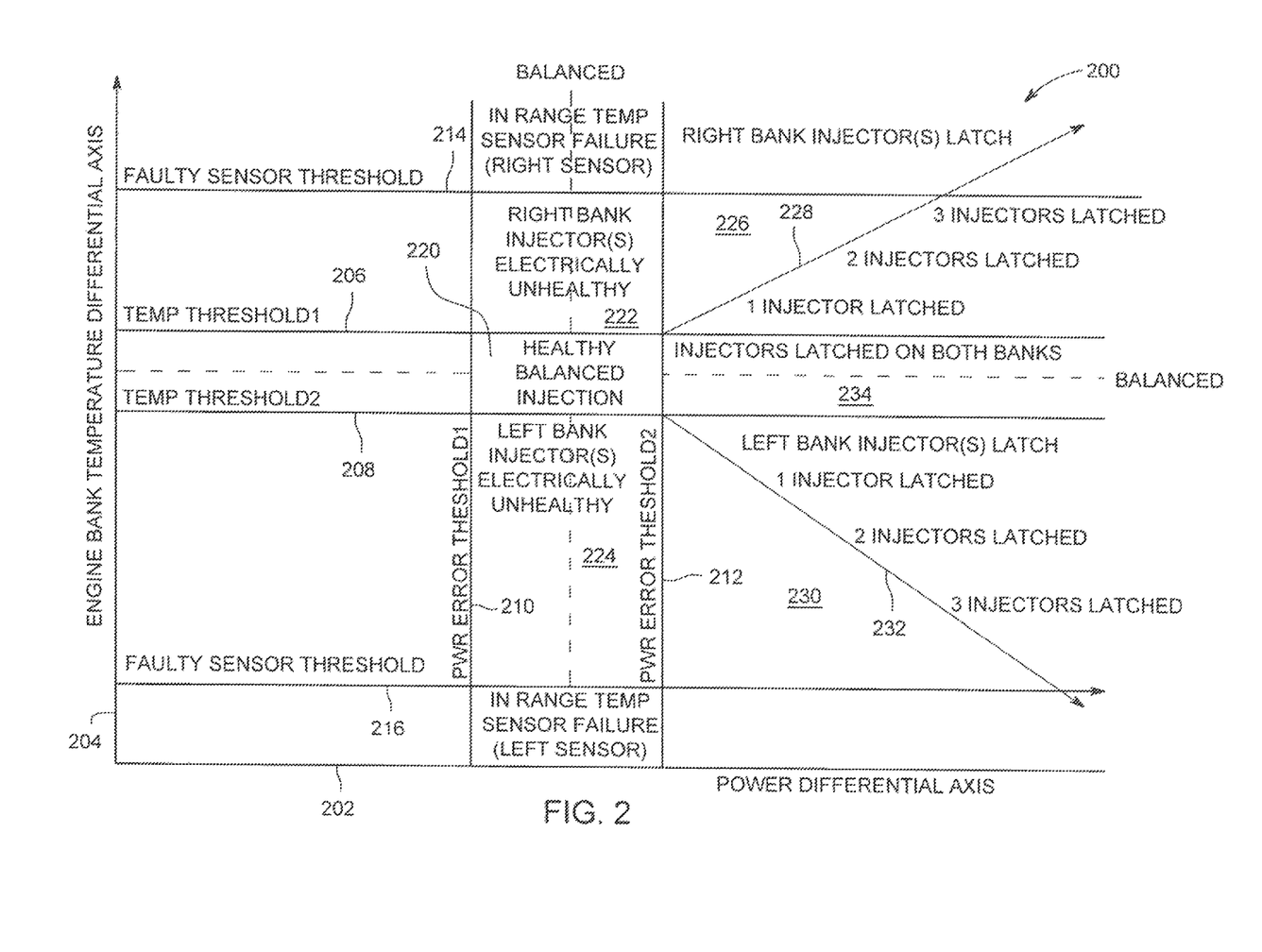
FIG. 2 illustrates a fault detection chart, according to an embodiment of the present disclosure.

FIG. 2 illustrates a fault detection chart 200 according to an embodiment of the present disclosure. Referring to FIGS. 1 and 2, the ECU 122 may determine mechanical, electrical, and sensor faults within an engine system 102 by analyzing various signals from the engine system 102 according to the fault detection chart 200.

The fault detection chart 200 includes a power differential axis 202 (for example, the X-axis) and an engine bank temperature differential axis 204. The power differential axis 202 represents a differential as determined by the ECU 122 of an estimated horsepower subtracted from a horsepower output generated by the engine system 102 (or vice versa). The estimated horsepower may be stored in a memory of the ECU 122, and may include various values that correlate fuel consumption with estimated horsepower for such fuel consumption. For example, at a first fuel consumption rate, the ECU 122 determines that a healthy engine system 102 should generate a first horsepower. The ECU 122 compares the estimated horsepower with the horsepower output (as determined through an analysis of the received electrical signals of the alternator 124) to determine an electrical status of the fuel injectors 114 and 120.

The engine bank temperature differential axis 204 represents a difference in temperature between the engine banks 106 and 108 as determined through an analysis of the temperature signals output by the exhaust temperature sensors 126 and 128 that are received by the ECU 122. The ECU 122 determines whether a difference exists between the output temperature signals received from the exhaust temperature sensors 126 and 18. If the received temperature signals are the same or within an acceptable range (as stored in the ECU 122), the ECU 122 determines that the engine banks 106 and 108 are balanced with respect to power output. If, however, there is a difference between the received temperature signals, the ECU 122 determines a mechanical malfunction of one or more fuel injectors 114 or 120.

The ECU 122 stores an upper temperature threshold 206, a lower temperature threshold 208, a lower power error threshold 210, an upper power error threshold 212, an upper faulty sensor threshold 214, and a lower faulty sensor threshold 216. Each of the thresholds 206, 208, 210, 212, 214, and 216 may be predetermined and set as desired. For example, based on desired engine performance (for example, desired tractive effort at a particular fuel consumption rate), the thresholds 206, 208, 210, 212, 214, and 216 may be determined and set.

The ECU 122 determines that the electrical outputs of the fuel injectors 114 and 120 of the engine banks 106 and 108 are balanced when a power differential value (such as determined through subtraction of a horsepower output from the estimated horsepower) is between the lower power error threshold 210 and the upper power error threshold 212. The ECU 122 determines that the number of healthy fuel injectors 114 of the engine bank 106 are balanced (that is, the same) with the number of healthy fuel injectors 120 of the engine bank 108 when a temperature differential value (such as determined through subtraction of the output temperature signal from the exhaust temperature sensor 126 from the output temperature signal from the exhaust temperature sensor 128) of the engine banks 106 and 108 is between the upper temperature threshold 206 and the lower temperature threshold 208. When the ECU determines a power differential value is between the thresholds 210 and 212, and the temperature differential value is between the thresholds 206 and 208, the ECU 122 determines a healthy, balanced fuel injection 220 among all of the fuel injectors 114 and 120.

If the ECU 122 determines that the power differential value is between the power error thresholds 210 and 212, but the temperature differential value is above the upper temperature threshold 206 within area 222, the ECU 122 determines that one or more of the fuel injectors 120 of the engine bank 108 are electrically unhealthy (that is, not properly performing electrically). If the temperature differential value is above the upper faulty sensor threshold 214, the ECU 122 determines that the exhaust temperature sensor 128 is faulty.

If the ECU 122 determines that the power differential value is between the power error thresholds 210 and 212, but the temperature differential value is below the lower temperature threshold 208 within area 224, the ECU 122 determines that one or more of the fuel injectors 114 of the engine bank 106 are electrically unhealthy. If the temperature differential value is below the lower faulty sensor threshold 216, the ECU 122 determines that the exhaust temperature sensor 126 is faulty.

If the ECU 122 determines that the power differential value exceeds the upper power error threshold 212, and the temperature differential value is above the upper temperature threshold 206 within the area 226, the ECU 122 determines that one or more of the fuel injectors 120 are mechanically malfunctioning (for example, latching). The ECU 122 is able to determine the number of mechanically malfunctioning fuel injectors 120 in relation to a slope 228. For example, if the location within the area 226 is close to the thresholds 206 and 212, the number of malfunctioning fuel injectors 120 may be one. The farther away from the thresholds 206 and 212 along the slope 228, the higher the number of malfunctioning fuel injectors 120.

Similarly, if the ECU 122 determines that the power differential value exceeds the upper power error threshold 212, and the temperature differential value is below the lower temperature threshold 208 within the area 230, the ECU 122 determines that one or more of the fuel injectors 114 are mechanically malfunctioning (for example, latching). The ECU 122 is able to determine the number of mechanically malfunctioning fuel injectors 114 in relation to a slope 232. For example, if the location within the area 230 is close to the thresholds 208 and 212, the number of malfunctioning fuel injectors 114 may be one. The farther away from the thresholds 208 and 212 along the slope 232, the higher the number of malfunctioning fuel injectors 114.

When the ECU 122 determines that the power differential value exceeds the upper power error threshold 212, but the temperature differential value is between the upper and lower temperature thresholds 206 and 208 within the area 234, the ECU determines 122 that the number of mechanically malfunctioning fuel injectors 114 and 120 of the engine banks 106 and 108 are balanced (that is, the same). For example, one fuel injector 114 is latched, and one fuel injector 120 is latched.

As described above, the ECU 122 may identify the engine bank 106 or 108 having at least one faulty fuel injector 114 or 120, and also estimate or otherwise determine the number of faulty fuel injectors 114 or 120 within each engine bank 106 or 108. By analyzing the power differential values and the temperature differential values, the ECU 122 is able to determine locations of mechanically and/or electrically unhealthy fuel injectors 114 and 120 within respective the engine banks 106 and 108 of the engine system 102. Accordingly, the ECU 122 may alert a central monitoring center as to the locations of the mechanical and electrical faults within the engine system 102, which thereby reduces the time for repair and/or replacement of the faulty fuel injectors. Additionally, the ECU 122 may determine whether the exhaust temperature sensors 126 and 128 are properly functioning based on whether detected temperature signals are beyond the faulty sensor thresholds 214 or 216.

As explained above, the ECU 122 may be configured to diagnose mechanical and electrical faults of the fuel injectors 114 and 120 of the engine system 102. Alternatively, a separate and distinct control unit may be used to diagnose the mechanical and electrical faults. The control unit may be within the vehicle, or may be remotely located from the vehicle. The control unit may be in communication with the various components of the engine system 102 through wireless connections, for example.

Figure 3A:
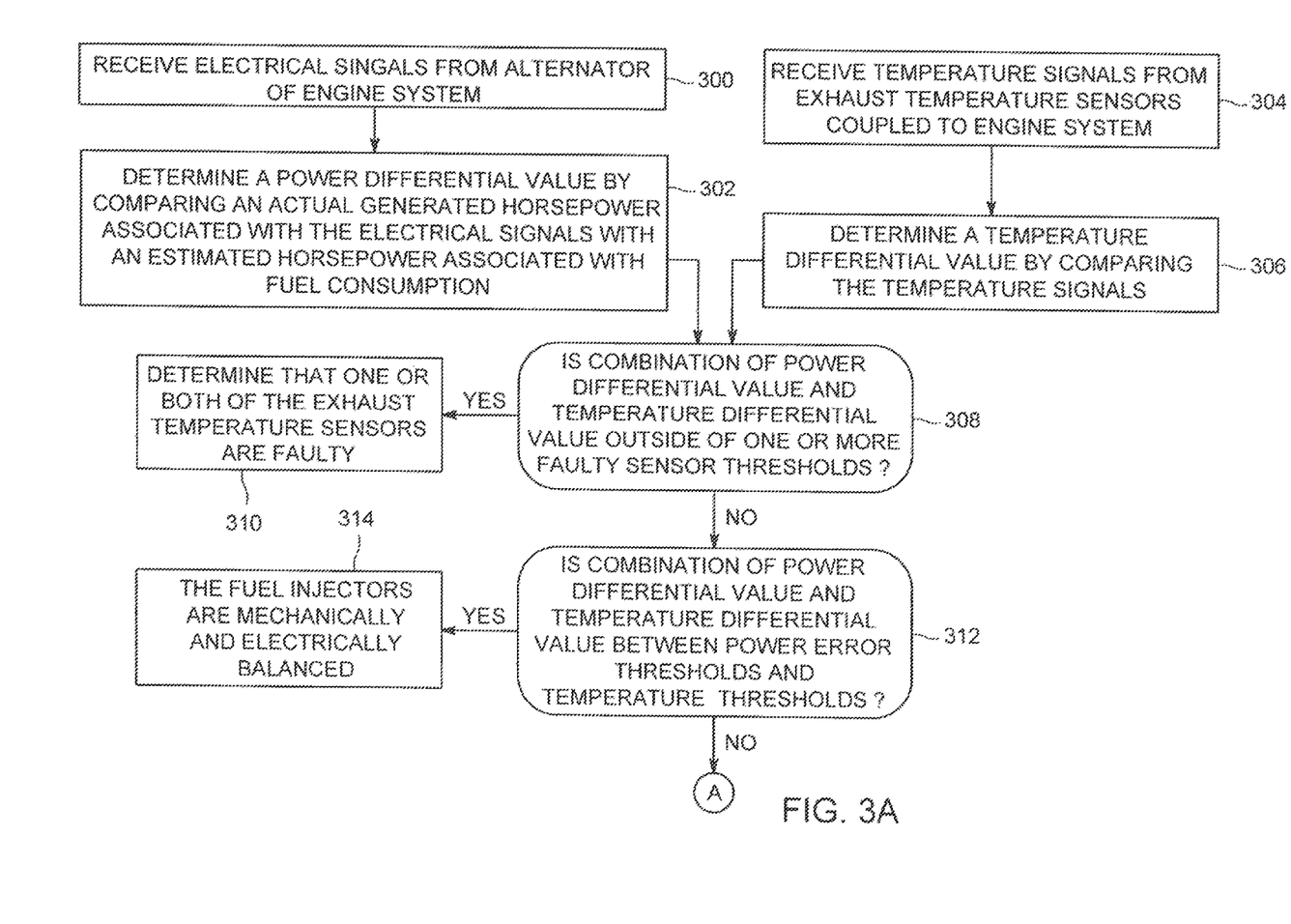
FIG. 3A and FIG. 3B) illustrates a flow chart of a method of diagnosing electrical and mechanical faults of fuel injectors of an engine system, according to an embodiment of the present disclosure.
Figure 3B:
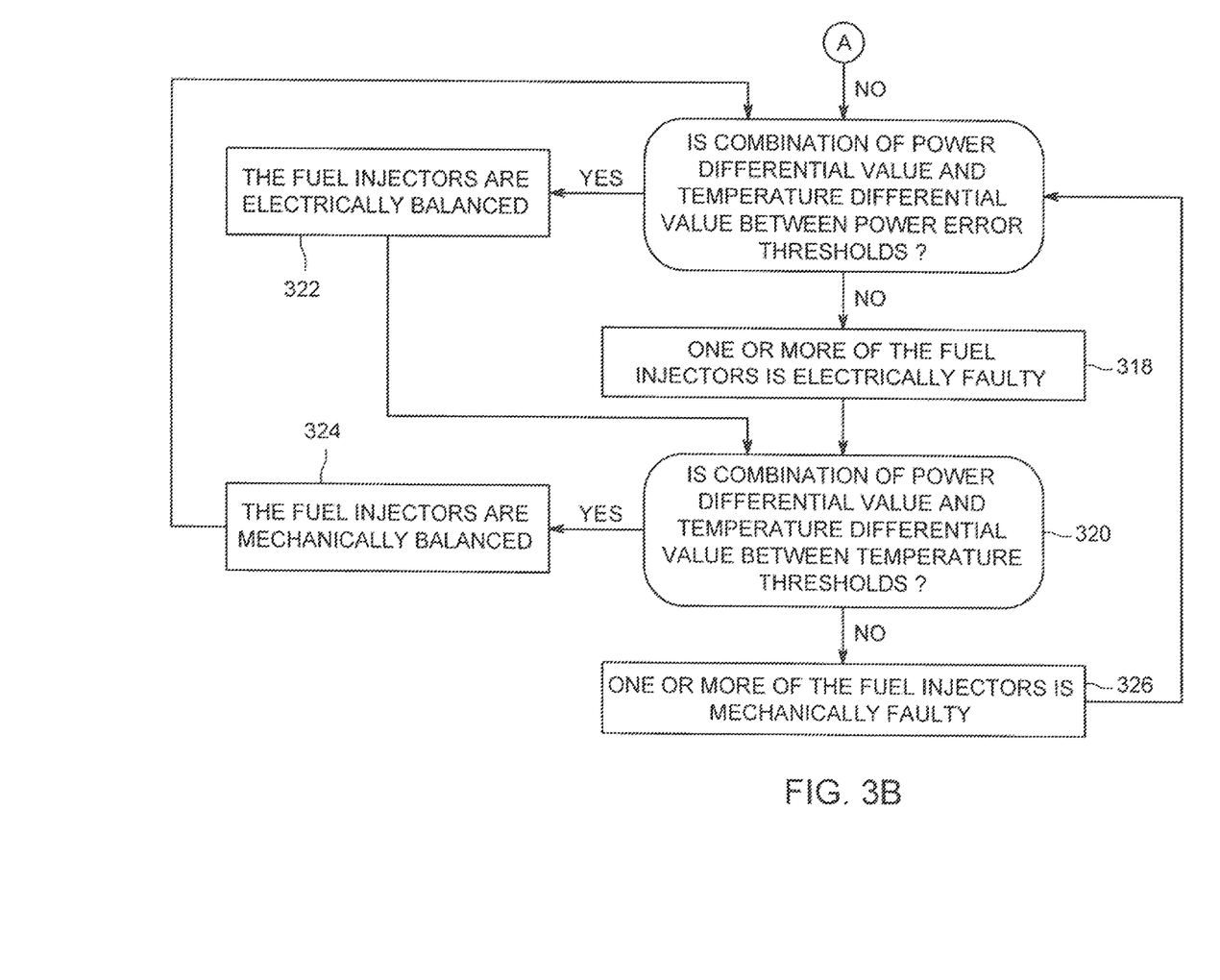

FIG. 3 (comprising a first part FIG. 3A and a second part FIG. 3B) illustrates a flow chart of a method of diagnosing electrical and mechanical faults of fuel injectors of an engine system, according to an embodiment of the present disclosure. A control unit, such as the ECU 122, may be configured to operate according to the flow chart shown in FIG. 3.

At 300, electrical signals (such as voltage and current signals) are received from an alternator of an engine system. The alternator may be part of a traction system of a vehicle. At 302, a power differential value is determined by comparing a horsepower output (such as actual generated horsepower) associated with the electrical signals with an estimated horsepower associated with current fuel consumption of the vehicle.

Concurrently with 300 (or, alternatively, before or after 300), temperature signals are received from exhaust temperature sensors coupled to the engine system at 304. At 306, a temperature differential value is determined through a comparison of the temperature different signals.

After the power differential value and the temperature differential value are determined, it is determined at 308 if a combination of the power differential value and the temperature differential value are outside of one or more faulty sensor thresholds. If so, the method proceeds from 308 to 310, in which it is determined that one or both of the exhaust temperature sensors are faulty.

The combination of the power differential value and the temperature differential value may include a first component, such as the power differential value, and a second component, such as the temperature differential value. The first or power differential value component may be analyzed in relation to power error thresholds, while the second or temperature differential value component may be analyzed in relation to temperature thresholds. The combination of the analyzed components together allows a control unit to determine mechanical and electrical faults of the fuel injectors. It is to be understood that "first" and "second are merely numerical references, and may be switched or otherwise interchanged.

If, however, the combination of the power differential value and the temperature differential value is not outside of one or more faulty sensor thresholds (that is, between or within the thresholds), the method proceeds from 308 to 312, in which it is determined if the combination is between power error thresholds and temperature thresholds. If so, the method proceeds from 312 to 314, in which it is determined that the fuel injectors of the engine system are mechanically and electrically balanced.

If, however, the combination is not between the power error threshold and the temperature thresholds, the method proceed from 312 to 316, in which it is determined if the combination is between the power error thresholds. If not, the method proceeds from the 316 to 318, in which it is determined that one or more of the fuel injectors is electrically faulty. The method then proceeds from 318 to 320, in which it is determined whether the combination is between the temperature thresholds.

If at 316, it is determined that the combination is between the power thresholds, the method proceeds from 316 to 322, in which it is determined that the fuel injectors of the engine system are electrically balanced (that is, proper electrical operation). The method then proceeds from 322 to 320.

If, at 320, it is determined that the combination is between the temperature thresholds, the method proceeds from 320 to 324, in which it is determined that the fuel injectors are mechanically balanced. The method then returns to 316.

If, however, the combination at 320 is not between the temperature thresholds, the method proceeds from 320 to 326, in which it is determined that one or more of the fuel injectors is mechanically faulty. The method may then return to 316.

Referring to FIGS. 1-3, embodiments of the present disclosure provide systems and methods of efficiently and reliably determining and diagnosing mechanical and electrical malfunctions of fuel injectors of an engine system. Embodiments of the present disclosure provide systems and methods of pinpointing one or more reasons for inefficient operation of an engine system.

In response to a determination of one or more mechanical and/or electrical faults of the fuel injectors 114 and 120 of the engine system 102, the ECU 122 may output a message (such as through a communication link) to a monitoring station, which may be at (or in communication with) a service and repair center. The ECU 122 may identify one or more fuel injectors that is faulty through wired connections with the faulty fuel injector(s) (e.g., through resistance measurements, electrical signals therebetween, and/or the like). As such, the service personal can quickly and easily find the malfunctioning fuel injector and repair or replace it.

The ECU 122 may also be in communication with a warning system onboard the vehicle 100. The ECU 122 may send fault signals to the onboard warning system 150, which may then display or broadcast visual and/or audio signals regarding the faults to an operator of the vehicle 100.

The ECU 122 may adjust operation of the engine system 102 based on detected faults. For example, based on the detected faults, the ECU 122 may adjust a trip plan, change power outputs of the engine banks 106 or 108, adjust fueling strategy, engine timing, and/or the like to increase the efficiency of the engine system 102, which may or may not include one or more faulty fuel injectors 114 or 120.

Embodiments of the present disclosure provide engine diagnostic systems and methods that are efficient and cost/labor-effective. The engine diagnostic systems and methods allow fuel injector faults to be quickly and accurately determined, leading service personnel to quickly repair or replace the faulty fuel injector(s). As such, embodiments of the present disclosure provide systems and methods that reduce the time, labor, and cost of repairing or otherwise maintaining engine systems.

The engine diagnostic systems and methods may be used with various vehicles, such as locomotives, automobiles, watercraft, aircraft, and/or the like. For example, in FIG. 1, the vehicle 100 may be a locomotive of a consist of a track-based vehicle. In another embodiment, the vehicle 100 may be an automobile. The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like.

As described above, certain embodiments of the present disclosure provide a system that may include at least one engine bank including a plurality of fuel injectors. At least one exhaust temperature sensor is coupled to the engine bank(s). The exhaust temperature sensor(s) is configured to output at least one temperature signal regarding an exhaust temperature of the engine bank(s). A traction system is configured to output at least one electrical signal related to a power output of a vehicle. In at least one embodiment, the electrical signal may be related to a power output of an alternator. A control unit is coupled to the exhaust temperature sensor(s) and the traction system. The control unit is configured to receive the temperature signal(s) and the electrical signal(s). The control unit is configured to determine a mechanical and electrical health of the fuel injectors by determining a temperature differential value of the temperature signal(s) and a power differential value related to the electrical signal(s), and analyzing a combination of the temperature differential value and the power differential value.

In at least one embodiment, the at least one engine bank may include first and second engine banks. The at least one exhaust temperature sensor may include first and second exhaust temperature sensors coupled to the first and second engine banks. The at least one temperature signal may include a first temperature signal of a first exhaust temperature of the first engine bank, and a second temperature signal of a second exhaust temperature of the second engine bank. The temperature differential value may be a difference between the first and second temperature signals.

In at least one embodiment, the at least one electrical signal may include one or both of voltage and current of an alternator of the traction system that relates to a horsepower output of the vehicle. The power differential value may include a comparison between the horsepower output of the vehicle and a stored estimated horsepower based on current fuel consumption of the vehicle.

In at least one embodiment, the control unit may be configured to determine a healthy balanced injection among all of the fuel injectors when the combination of the temperature differential value and the power differential value is between upper and lower temperature thresholds related to the temperature differential value (for example, a temperature differential value component of the combination is between the upper and lower temperature thresholds) and upper and lower power error thresholds related to the power differential value (for example, a power differential value component of the combination is between the upper and lower power error threshold).

The control unit may be configured to determine an electrical fault of at least one of the fuel injectors when the combination of the temperature differential value and the power differential value is above the upper temperature threshold or below the lower temperature threshold, and between the upper and lower power error thresholds. For example, a temperature differential value component of the combination is above the upper temperature threshold or below the lower temperature threshold, while a power differential value component of the combination is between the upper and lower power error thresholds.

The control unit may be configured to determine a mechanical fault of at least one of the fuel injectors when the combination of the temperature differential value and the power differential value is above the upper temperature threshold or below the lower temperature threshold, and above the upper power error threshold or below the lower power error threshold. For example, a temperature differential value component of the combination is above the upper temperature threshold or below the lower temperature threshold, while a power differential value component of the combination is above the upper power error threshold or below the lower error threshold.

The control unit may be configured to determine a number of mechanical faults of the fuel injectors based on a position of the combination of the temperature differential value and the power differential value in relation to the upper or lower power error thresholds and at least one faulty sensor threshold.

The control unit may be configured to determine a balanced mechanical fault between first and second engine banks when the combination of the temperature differential value and the power differential value is between the upper and lower temperature thresholds, and above the upper power error threshold or below the lower power error threshold.

In at least one embodiment, the control unit may be configured to determine a fault in the exhaust temperature sensor(s) when the combination of the temperature differential value and the power differential value is beyond one or more faulty sensor thresholds.

In at least one embodiment, the control unit may be or otherwise include an engine control unit onboard the vehicle.

Certain embodiments of the present disclosure provide a method that may include injecting fuel into at least one engine bank with a plurality of fuel injectors, outputting at least one temperature signal regarding an exhaust temperature of the engine bank(s) by at least one exhaust temperature sensor that is coupled to the at least one engine bank, outputting at least one electrical signal related to a power output of a vehicle by a traction system, receiving the temperature signal and the electrical signal with a control unit, determining a mechanical and electrical health of the plurality of fuel injectors, using a control unit, by determining a temperature differential value of the temperature signal(s) and a power differential value related to the electrical signal(s), and analyzing a combination of the temperature differential value and the power differential value.

In at least one embodiment, the at least one engine bank may include first and second engine banks. The at least one exhaust temperature sensor may include first and second exhaust temperature sensors coupled to the first and second engine banks. The at least one temperature signal may include a first temperature signal of a first exhaust temperature of the first engine bank, and a second temperature signal of a second exhaust temperature of the second engine bank. The temperature differential value may be determined by determining a difference between the first and second temperature signals.

In at least one embodiment, the at least one electrical signal may include one or both of voltage and current of an alternator of the traction system that relates to a horsepower output of the vehicle. The power differential value may be determined by comparing the horsepower output of the vehicle and a stored estimated horsepower based on current fuel consumption of the vehicle.

The determining the mechanical and electrical health operation may include determining a healthy balanced injection among all of the fuel injectors when the combination of the temperature differential value and the power differential value is between upper and lower temperature thresholds related to the temperature differential value and upper and lower power error thresholds related to the power differential value.

The determining the mechanical and electrical health operation may include determining an electrical fault of at least one of the fuel injectors when the combination of the temperature differential value and the power differential value is above the upper temperature threshold or below the lower temperature threshold, and between the upper and lower power error thresholds.

The determining the mechanical and electrical health operation may include determining a mechanical fault of at least one of the fuel injectors when the combination of the temperature differential value and the power differential value is above the upper temperature threshold or below the lower temperature threshold, and above the upper power error threshold or below the lower power error threshold.

The determining the mechanical and electrical health operation may include determining a number of mechanical faults of the fuel injectors based on a position of the combination of the temperature differential value and the power differential value in relation to the upper or lower power error thresholds and at least one faulty sensor threshold.

The determining the mechanical and electrical health operation may include determining a balanced mechanical fault between first and second engine banks when the combination of the temperature differential value and the power differential value is between the upper and lower temperature thresholds, and above the upper power error threshold or below the lower power error threshold.

The determining the mechanical and electrical health operation may include determining a fault in the at least one exhaust temperature sensor when the combination of the temperature differential value and the power differential value is beyond one or more faulty sensor thresholds.

The method may also include disposing the control unit onboard the vehicle as an engine control unit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A system, comprising:
   at least one engine bank including a plurality of fuel injectors;
   at least one exhaust temperature sensor coupled to the at least one engine bank, wherein the at least one exhaust temperature sensor is configured to output at least one temperature signal regarding an exhaust temperature of the at least one engine bank;
   a traction system that is configured to output at least one electrical signal related to a power output of a vehicle; and
   a control unit coupled to the at least one exhaust temperature sensor and the traction system, wherein the control unit is configured to receive the at least one temperature signal and the at least one electrical signal, and wherein the control unit is configured to determine a mechanical and electrical health of the plurality of fuel injectors based on a combination of a determined temperature differential value of the at least one temperature signal and a determined power differential value related to the at least one electrical signal.

2. The system of claim 1, wherein the at least one engine bank comprises first and second engine banks, wherein the at least one exhaust temperature sensor comprises first and second exhaust temperature sensors coupled to the first and second engine banks, wherein the at least one temperature signal comprises a first temperature signal of a first exhaust temperature of the first engine bank, and a second temperature signal of a second exhaust temperature of the second engine bank, and wherein the temperature differential value is a difference between the first and second temperature signals.

3. The system of claim 1, wherein the at least one electrical signal comprises one or both of voltage and current of an alternator of the traction system that relates to a horsepower output of the vehicle, and wherein the power differential value comprises a comparison between the horsepower output of the vehicle and a stored estimated horsepower based on current fuel consumption of the vehicle.

4. The system of claim 1, wherein the control unit is configured to determine a healthy balanced injection among all of the fuel injectors when the combination of the temperature differential value and the power differential value is between upper and lower temperature thresholds related to the temperature differential value and upper and lower power error thresholds related to the power differential value.

5. The system of claim 4, wherein the control unit is configured to determine an electrical fault of at least one of the fuel injectors when the combination of the temperature differential value and the power differential value is above the upper temperature threshold or below the lower temperature threshold, and between the upper and lower power error thresholds.

6. The system of claim 4, wherein the control unit is configured to determine a mechanical fault of at least one of the fuel injectors when the combination of the temperature differential value and the power differential value is above the upper temperature threshold or below the lower temperature threshold, and above the upper power error threshold or below the lower power error threshold.

7. The system of claim 6, wherein the control unit is configured to determine a number of mechanical faults of the fuel injectors based on a position of the combination of the temperature differential value and the power differential value in relation to the upper or lower power error thresholds and at least one faulty sensor threshold.

8. The system of claim 4, wherein the control unit is configured to determine a balanced mechanical fault between first and second engine banks when the combination of the temperature differential value and the power differential value is between the upper and lower temperature thresholds, and above the upper power error threshold or below the lower power error threshold.

9. The system of claim 1, wherein the control unit is configured to determine a fault in the at least one exhaust temperature sensor when the combination of the temperature differential value and the power differential value is beyond one or more faulty sensor thresholds.

10. The system of claim 1, wherein the control unit comprises an engine control unit onboard the vehicle.

11. A method, comprising:
injecting fuel into at least one engine bank with a plurality of fuel injectors;
outputting at least one temperature signal regarding an exhaust temperature of the at least one engine bank by at least one exhaust temperature sensor that is coupled to the at least one engine bank;
outputting at least one electrical signal related to a power output of a vehicle;
receiving the at least one temperature signal and the at least one electrical signal with a control unit; and
determining a mechanical and electrical health of the plurality of fuel injectors, using the control unit, based on a combination of a determined temperature differential value of the at least one temperature signal and a determined power differential value related to the at least one electrical signal.

12. The method of claim 11, wherein the at least one engine bank comprises first and second engine banks, wherein the at least one exhaust temperature sensor comprises first and second exhaust temperature sensors coupled to the first and second engine banks, wherein the at least one temperature signal comprises a first temperature signal of a first exhaust temperature of the first engine bank, and a second temperature signal of a second exhaust temperature of the second engine bank, and wherein the temperature differential value is determined by determining a difference between the first and second temperature signals.

13. The method of claim 11, wherein the at least one electrical signal comprises one or both of voltage and current of an alternator of a traction system that relates to a horsepower output of the vehicle, and wherein the power differential value is determined by comparing the horsepower output of the vehicle and a stored estimated horsepower based on current fuel consumption of the vehicle.

14. The method of claim 11, wherein the determining the mechanical and electrical health operation comprises determining a healthy balanced injection among all of the fuel injectors when the combination of the temperature differential value and the power differential value is between upper and lower temperature thresholds related to the temperature differential value and upper and lower power error thresholds related to the power differential value.

15. The method of claim 14, wherein the determining the mechanical and electrical health operation comprises determining an electrical fault of at least one of the fuel injectors when the combination of the temperature differential value and the power differential value is above the upper temperature threshold or below the lower temperature threshold, and between the upper and lower power error thresholds.

16. The method of claim 14, wherein the determining the mechanical and electrical health operation comprises determining a mechanical fault of at least one of the fuel injectors when the combination of the temperature differential value and the power differential value is above the upper temperature threshold or below the lower temperature threshold, and above the upper power error threshold or below the lower power error threshold.

17. The method of claim 16, wherein the determining the mechanical and electrical health operation comprises determining a number of mechanical faults of the fuel injectors based on a position of the combination of the temperature differential value and the power differential value in relation to the upper or lower power error thresholds and at least one faulty sensor threshold.

18. The method of claim 14, wherein the determining the mechanical and electrical health operation comprises determining a balanced mechanical fault between first and second engine banks when the combination of the temperature differential value and the power differential value is between the upper and lower temperature thresholds, and above the upper power error threshold or below the lower power error threshold.

19. The method of claim 11, wherein the determining the mechanical and electrical health operation comprises determining a fault in the at least one exhaust temperature sensor when the combination of the temperature differential value and the power differential value is beyond one or more faulty sensor thresholds.

20. The method of claim 11, wherein the control unit is disposed onboard the vehicle as an engine control unit.

* * * * *